United States Patent
Branson

[11] Patent Number: 6,140,917
[45] Date of Patent: Oct. 31, 2000

[54] INSTRUMENT DISPLAY

[76] Inventor: Robert Branson, 8438 N. 56th Ave., Glendale, Ariz. 85302-6020

[21] Appl. No.: 09/188,460

[22] Filed: Nov. 9, 1998

[51] Int. Cl.⁷ ..................................................... B60Q 1/00
[52] U.S. Cl. ......................... 340/461; 340/441; 340/936
[58] Field of Search .................................. 340/441, 466, 340/461, 936

[56] References Cited

U.S. PATENT DOCUMENTS

| 5,554,970 | 9/1996 | Mottahedeh | 340/441 |
| 5,627,510 | 5/1997 | Yuan | 340/435 |

*Primary Examiner*—Daryl Pope
*Attorney, Agent, or Firm*—Harrison & Egbert

[57] ABSTRACT

An instrument display having a face with measurement indicia formed thereon and a pointer rotatably mounted relative to the face. The face has a zoned area formed thereon of a different color than a remainder of the face. The zoned area extends over an area of the instrument face corresponding with a limit of the measurement indicia. The pointer has an indicator thereon. The pointer has a shape with an area greater than the zoned area. The pointer exposes a portion of the zoned area when the pointer is directed to a measurement outside of the limit. The zoned area is a quadrilateral section having a side extending from a pivot point of the pointer to the limit. The pointer has a generally triangular shape with the vertex of the triangular shape being adjacent the pivot point.

19 Claims, 2 Drawing Sheets

INSTRUMENT DISPLAY

TECHNICAL FIELD

The present invention relates to instruments generally. More particularly, the present invention relates to the face of instruments having areas suitable for warning the user of an instance in which a desired limit has been exceeded.

BACKGROUND ART

Speedometers are, of course, standard equipment on automobiles, trucks, motorcycles, buses and most bicycles, as well as other vehicles. Conventional speedometers usually indicate the speed of the vehicle by the position of a needle on the dial of the speedometer. In many instances, the dial is lighted for better viewing, particularly at night. However, since the speedometer dial is positioned on the vehicle's instrument panel well below the direct line of sight needed by the driver when steering the vehicle, most drivers usually can spare only an occasional quick glance at the dial when maneuvering the vehicle. Such a glance is ordinarily given while the driver's main attention is elsewhere. Accordingly, although the speed at which the vehicle is traveling is ostensibly periodically monitored by the driver through his occasional glances at the dial, such glances usually leave little impression on the driver. Instead, the driver usually depends on the flow of traffic, road feel and other factors to guess the vehicle's speed. Such a practice can easily lead to habitually dangerously high vehicle speeds and increased risk of accidents, speeding citations and financial loss.

Conventional speedometers do not provide speed warnings to aid the driver in such circumstances as described above. A few specialized devices have been employed in conjunction with speedometers to give speed warnings. However, such devices are expensive and invariably require disassembly of the speedometer or the construction of a speedometer of special design and its substitution for the one with which the vehicle is equipped. Few of such devices have ever been used and none have been used extensively and successfully.

In the past, various U. S. patents have issued relating to various types of speedometers and related instrument faces. For example, U.S. Pat. No. 2,158,925, issued on May 16, 1939, to W. W. Braswell, teaches an indicator for a speedometer where color changes indicate higher speeds. The face of the speedometer is covered with patches of varying colors. A standard pointer is provided on the central axis of the instrument face so as to indicate the condition. Eventually, when the indicator moves into a different colored area, the operator will become aware of the fact that a particular condition will occur. This device does not utilize a wide instrument pointer which is capable of covering the bright colored area on the face.

U.S. Pat. No. 2,984,204, issued on May 16, 1961 to C. J. White, describes a rotating pointer that uses a cover for the dial to cause a "psychological" reaction. This indicator utilizes a triangular shaped pointer which moves along the face of the dial.

U.S. Pat. No. 2,951,462, issued on Sep. 6, 1960 to E. G. M. Wilkes et. al., describes a rotating cover for a speedometer that reveals color changes at certain speeds. This device utilizes a conventional pointer. This device only utilizes a colored zone of increasing width that is provided around the periphery of the instrument face.

U.S. Pat. No. 3,980,041, issued on Sep. 14, 1976 to R. B. Evans, describes a speedometer with a speed warning indicator. In particular, this device utilizes a transparent plate, such as a transparent decal, having an attached transparent plastic sheet bearing adhesive for attaching it to the transparent face cover of the speedometer. The plate bears indicia, such as color and/or a plurality of spaced lines, demarking the plate and the speedometer dial viewed through the plate. As a result, it indicates a speed warning on the dial while still permitting unobstructed viewing of all of the dial.

It is an object of the present invention to provide an instrument display which gives an immediate warning signal to the operator of the vehicle when a limit has been exceeded.

It is another object of the present invention to provide an instrument face in which the pointer itself serves to expose the warning indicia.

It is a further object of the present invention to provide an instrument face which will change shape as the warning zone continues to be uncovered by the pointer.

It is still a further object of the present invention to provide an instrument display which is easy to use, relatively inexpensive and easy to manufacture.

These and other objects and advantages of the present invention will become apparent from a reading of the attached specification and appended claims.

SUMMARY OF THE INVENTION

The present invention is an instrument display comprising a face with measurement indicia formed thereon and a pointer rotatably mounted relative to the face. The face has a zoned area formed thereon. This zoned area is of a different color than a remainder of the face. The zoned area extends over an area of the instrument face corresponding with a limit and the exceeding of a limit of the measurement indicia. The pointer has an indicator thereon for indicating a real time condition. The pointer has a shape with an area greater than the zoned area. The pointer serves to expose a portion of the zoned area when the pointer is directed to a measurement outside of the limit.

In the preferred embodiment of the present invention, the zoned area is a quadrilateral section having a side extending along a line from the pivot point of the pointer to the limit. This quadrilateral section has ends extending inwardly at an acute angle from the sides. The zoned area is formed of a brighter color than the remainder of the face.

The pointer has a pivot point located generally centrally of the face. The pointer is rotatable about this pivot point. The indicator is a line on the side of the pointer opposite the pivot point. This line is directed to a measurement numeral indicating a real time condition. The pointer has a generally triangular shape with a vertex adjacent to the pivot point. The pointer has a first side extending from the pivot point. The pointer has a second side extending at an acute angle relative to the first side. The pointer has a curved side extending from the first side to the second side. The curved side is adjacent to the measurement indicia. The pointer is of an opaque material. The pointer can also be of a different color than the zoned area.

DETAILED DESCRIPTION OF THE INVENTION

Figure 1:
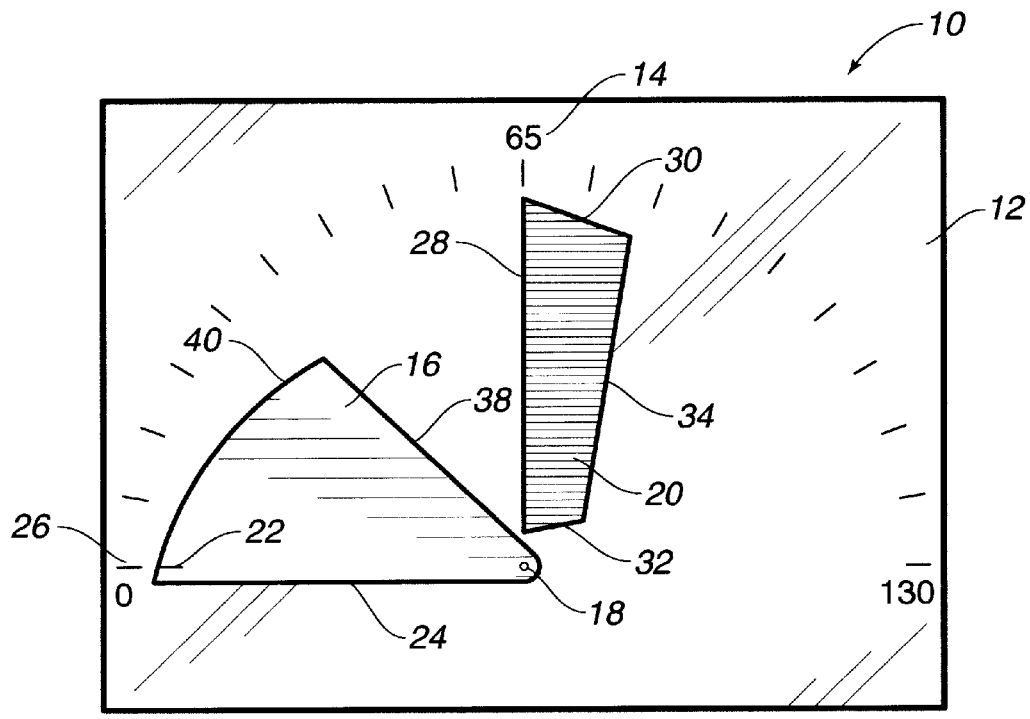
FIG. 1 is a frontal view of the instrument display of the present invention with the pointer in one position.
Figure 2:
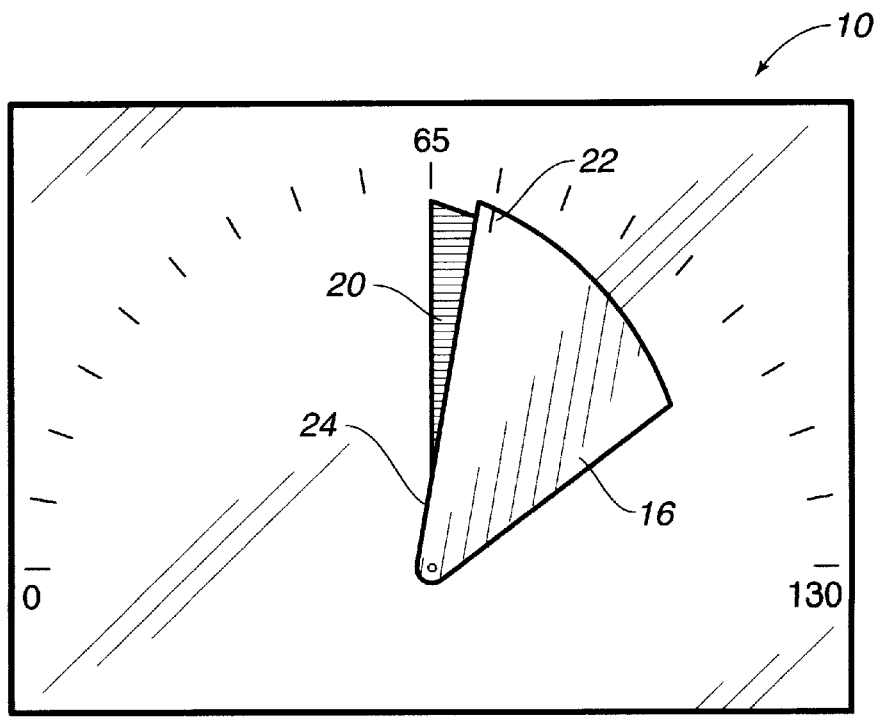
FIG. 2 is a frontal view of the instrument display of the present invention with the pointer in another position.

Referring to FIG. 1, there is shown at 10 the instrument display in accordance with the preferred embodiment of the present invention. The instrument display 10 includes a face 12 having measurement indicia 14 formed thereon. A pointer 16 is rotatably mounted at pivot point 18 to the instrument face 12. The face 12 has a zoned area 20 formed thereon. As can be seen, the zoned area 20 is of a different color than the remainder of the face 12. The zoned area 20 extends over the area of the instrument face 12 corresponding with a limit of the measurement indicia 14. The pointer 16 has an indicator 22 thereon. The pointer 16 has a shape with an area greater than the zoned area 20. With reference to FIG. 2, the pointer 16 will expose a portion of the zoned area 20 when the pointer 16 is directed to a measurement outside of a desired limit.

In FIG. 1, the instrument face 12 is associated with a speedometer. In FIG. 1, it can be seen that the indicator 22 on the pointer 16 is directed to an indication of zero miles per hour. In this condition, the side 24 of the pointer 16 will reside in a horizontal orientation from the pivot point 18 to the numerical indication 26 of zero miles per hour.

In FIG. 1, the zoned area 20 has a side extending along a line 28 extending from the pivot point 18 to the numerical indication of sixty-five miles per hour. The zoned area 20 has a quadrilateral shape. The sides 30 and 32 of the quadrilateral shape of zoned area 20 extend inwardly from side 28 at an acute angle. The opposite side 34 is directed outwardly from side 28 for a desired distance so as to indicate the desired warning area beyond the speed limit.

The pointer 16 has a generally triangular shape. The pivot point 18 is located at the vertex of this triangular shape. The triangular shape of the pointer 16 includes first side 24, the second 38, and a curved side 40. The curved side 40 will be adjacent to the measurement indicia 14.

As the speed of the vehicle increases, the pointer 16 will rotate relative to the face 12 such that the indicator 22 will correspond to the real time condition of the speed of the vehicle. FIG. 2 shows what occurs when the vehicle exceeds the desired speed limit.

In FIG. 2, it can be seen that the pointer 16 has moved from its position in which the indicator 22 pointed to zero miles per hour to a position in which the indicator is directed at approximately seventy miles per hour. Since seventy miles per hour exceeds the sixty-five mile per hour speed limit, the side 24 of the indicator 16 has rotated so as to expose a portion of the zoned area 20. Since the zoned area 20 is of a bright color, the driver of the vehicle will immediately know that he has exceeded the speed limit. Additionally, the shape of the exposed area created by side 24 with respect to the zoned area 20 will provide the driver with an immediate visual indication as to the degree to which the speed limit has been exceeded. The unique configuration of the triangular-shaped pointer 16 relative to the quadrilateral shape of the zoned area 20 provides a striking and unusual visual indication to the vehicle driver of the degree to which the speed limit, or other measurement, has been exceeded. When the zoned area 20 is completely exposed, then the driver of the vehicle will have a clear understanding that he or she is well beyond acceptable speed limits.

In the present invention, the pointer 16 is shown as having an indicator line 22 so as to indicate a real time condition. However, the indicator line could also be the edge 24 of the pointer 16. Additionally, in the present invention, it is important that the pointer 16 be of an opaque material. As such, when the pointer 16 covers the zoned area 20, the zoned area 20 will not be seen by the driver of the vehicle. In other circumstances, if desired, the pointer 16 can be formed of a different color than the zoned area 20.

Figure 3:
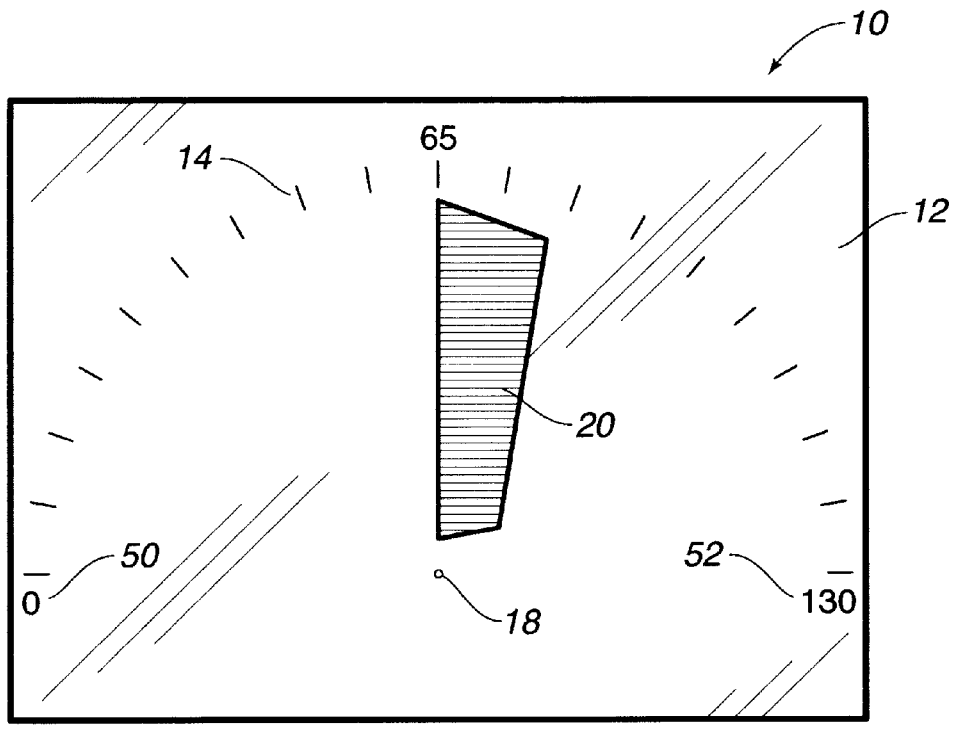
FIG. 3 is a frontal isolated view of the instrument face of the present invention.

FIG. 3 shows the instrument face 12 of the instrument display 10. As can be seen in FIG. 3, the face 12 has measurement indicia 14 extending therearound in a semi-circular radial pattern. At one end of the measurement indicia 14 is the zero limit 50. The opposite end 52 of measurement indicia 14 shows an indication of one hundred thirty miles per hour. The zoned area 20 is located generally centrally of the instrument face 12. The pivot point 18 for the pointer 16 is also located generally centrally of the measurement indicia 14. The measurement indicia 14 will extend outwardly radially relative to the pivot point 18.

Figure 4:
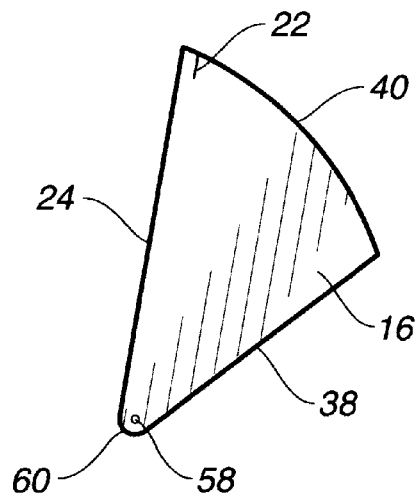
FIG. 4 is an isolated view of the pointer of the present invention.

FIG. 4 shows the pointer 16. The pointer 16 is connected to the pivot point 18 with opening 58. Opening 58 is located generally at the vertex 60 of the generally triangular shape of the pointer 16. The pointer 16 has first side 24 with second side 38 extending at an acute angle relative to the first side 24. Curved side 40 extends between the first side 24 and the second side 38 opposite the vertex 60. The indicator line 22 extends radially from the vertex 60 to the curved side 40 so as to provide an indication of a real time condition.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. An instrument comprising:

a face having measurement indicia formed thereon, said face having a zoned area formed thereon, said zoned area being of a different color than a remainder of said face, said zoned area extending over an area of said instrument face corresponding with a desired limit of said measurement indicia, said zoned area being a quadrilateral section; and a pointer rotatably mounted relative to said face, said pointer having an indicator thereon, said pointer having a shape with an area greater than said zoned area, said pointer exposing a portion of said zoned area when said pointer is directed to a measurement outside of said desired limit.

2. The display of claim 1, said measurement indicia being miles per hour, said limit being 65 miles per hour, said zoned area having a side extending to the indicia associated with 65 miles per hour.

3. The display of claim 1, said zoned area having a side of said quadrilateral section extending along a line from a pivot of said pointer to said limit.

4. The display of claim 3, said quadrilateral section having ends extending inwardly at an acute angle from said side.

5. The display of claim 1, said zoned area being formed of a brighter color than the remainder of said face.

6. The display of claim 1, said pointer having a pivot point located generally centrally of said face, said pointer rotatable about said pivot point.

7. The display of claim 6, said indicator being a line on a side of said pointer opposite said pivot point, said line directed to a measurement in numeral indicative of a real time condition.

8. The display of claim 6, said pointer having a generally triangular shape, said pointer having a vertex adjacent said pivot point.

9. The display of claim 1, said pointer having a first side extending from a pivot point, said pointer having a second side extending at an acute angle relative to said first side, said pointer having a curved side extending from said first side to said second side.

10. The display of claim 9, said curved side being adjacent said measurement indicia.

11. The display of claim 1, said pointer being opaque.

12. The display of claim 1, said pointer being of a different color than said zoned area.

13. An instrument display comprising:

a face having measurement indicia formed thereon, said face having a zoned area formed thereon, said zoned area being of a different color than a remainder of said face, said zoned area being a quadrilateral section; and a pointer rotatable relative to face, said pointer having a generally triangular shape with a vertex of said triangular shape being at a pivot point of said pointer, said pointer having an area greater than an area of said zoned area.

14. The display of claim 13, said pointer having a first side extending from said pivot point, said pointer having a second side extending at an acute angle relative to said first side, said pointer having a curved side extending from said first side to said second side.

15. The display of claim 14, said curved side being adjacent said measurement indicia.

16. The display of claim 13, said pointer being opaque.

17. The display of claim 13, said zoned area having a side of said quadrilateral section extending on a line from said pivot point of said pointer to a desired measurement indicia.

18. An instrument display comprising:

a face having measurement indicia formed thereon, said face having a zoned area formed thereon, said zoned area being of a different color than a remainder of said face, said zoned area extending over an area of said instrument face corresponding with a limit of said measurement indicia, said zoned area being a quadrilateral section having a side of said quadrilateral section extending along a line corresponding to said limit; and a pointer rotatably mounted relative to said face, said pointer having an indicator thereon, said pointer having a shape with an area greater than said zoned area, said pointer having a generally triangular shape, said pointer having a vertex adjacent said pivot point.

19. The display of claim 18, said quadrilateral section having ends extending inwardly at an acute angle from said side, said pointer exposing a portion of said zoned area when said pointer is directed to a measurement indicia outside of said limit.

* * * * *